3,076,761
Patented Feb. 5, 1963

3,076,761
COMPOSITION FOR PREVENTING ACID SLUDGE IN OIL WELL ACIDIZING PROCESS
Wendell G. Markham, Downey, Calif., assignor to Petrolite Corporation, Ltd., Wilmington, Del., a corporation of Delaware
No Drawing. Filed Aug. 20, 1959, Ser. No. 834,950
30 Claims. (Cl. 252—8.55)

This invention relates to the art or procedure commonly referred to as the acidization of oil-bearing strata which comprises introducing an acid into an oil well for the purpose of causing the acid to disintegrate, dissolve, or react with the oil-bearing structure of the well, in a manner which results in an increase in the amount of crude petroleum obtained from the oil-bearing strata. More particularly, this invention relates to compositions useful in preventing the formation of acid sludge during such acidization, and to the use of said compositions in acidizing oil-bearing strata.

The acidization of oil-bearing strata is a well known method of increasing oil production. The main constituent of such acid treating compositions is an acid, usually hydrochloric acid. This treating fluid, sometimes known as oil well acid, usually contains a demulsifier, a corrosion inhibitor, a surfactant, and various other agents required for a specific reaction on the oil-bearing strata. For example, in strata which are predominantly sandstone, hydrofluoric acid, fluorides, boric acid, etc., are also constituents of the acid treating composition. Although commercial hydrochloric acid is available at a concentration of 32.5 to 37 percent by weight, concentrated acid is generally diluted with water to 15 percent for most acidizing jobs. However, acid varying in strength from about 5 to about 30 percent HCl has been employed in the preparation of oil well acid.

In general, the composition of the oil-bearing strata and the bottom hole temperature are the chief factors which influence the selection of all additives except the demulsifier. Selection of the demulsifier is generally dependent upon the crude oil itself. Although many crude oils when mixed with acid will form emulsions if no demulsifier is present, small amounts of a properly selected demulsifier in the acid will effect demulsification of the acid from the crude oil within a short time.

Another factor which is a cause of ineffective acidizing is the formation of acid sludge. Most people do not recognize this factor, since they believe acid sludge and acid-in-oil emulsions to be the same thing. However, it cannot be overemphasized that acid sludge and emulsification are two separate and distinct phenomena. Acid sludge often occurs where no emulsions are formed or where a demulsifier is present to assist in the separation of two liquid phases. An acid sludge consists of tiny solid dark particles which settle to the bottom of the oil layer at the interface above the acid layer. Often it may be observed visually as a wafer after the supernatant crude oil has been poured off. In a well this acid sludge clogs the pores of the formation and thus diminishes the flow of oil to the well bore. The technique of stimulating oil production by the acidization of some oil-bearing zones in California has often been avoided or discontinued where the formation of acid sludge with hydrochloric acid poses a severe problem.

I have observed that acids such as sulfuric, hydrochloric, nitric, trichloroacetic, etc., form acid sludges when intimately mixed with some, but not all, crude oils at room temperature or above. The amount and properties of the sludge formed is dependent upon variables such as: temperature, acid-to-oil ratio, degree of mixing, acid normality, degree of ionization, reaction time, and the zone or strata from which the oil is obtained. Acid sludge may be recognized as the viscous layer which separates oil from acid after all the acid has separated from the oil upon standing a few hours after mixing. Often the sludge layer can be separated from the oil and the acid in the form of a wafer. The wafer, when dried, appears to consist of loosely consolidated solid particles of asphaltenes which are completely soluble in carbon disulfide. Since acid sludge is composed primarily of solids, it is not an emulsion, although an emulsion may contain particles of acid sludge.

The mechanism of acid sludge formation is not understood. However, I have tested crudes from several states including California, Colorado, Wyoming, and abroad, for example Iran, and have found a sufficient amount of acid sludge formed to severely damage a formation by clogging subsequent to acidization. Acid sludge is not formed in all acid jobs. Samples of crude oil from various locations were tested to see if they all formed an acid sludge upon being intimately mixed with an equal volume of 15 percent HCl at room temperature, then allowed to settle at 140° F. Many crudes formed no acid sludge when tested in this manner. Some formed acid sludge which varied from 0 to 16 percent of the oil volume. It was observed that crude oils from different zones, in the same field, have different sludging characteristics as shown in Table I below.

TABLE I

*Acid Sludge Tests With Seal Beach and Inglewood Crudes*

INGLEWOOD, CALIFORNIA, FIELD

| Zone | ° API | Production interval [1] | Acid sludge (vol. percent of crude) |
|---|---|---|---|
| Investment | 15.2 | 799–1,043 | None |
| Vickers | 21.8 | 1,300–2,646 | None |
| Rindge | 28.7 | 2,551–3,210 | 2 |
| Rubel | 28 | 3,256–3,460 and 3,819–3,948 | 8 |
| Moynier | 23.8 | 4,482–5,476 | 3 |
| Sentous | 36.3 | 8,124–3,823 | 4 |

SEAL BEACH, CALIFORNIA, FIELD

| San Gabriel | 23.3 | 4,506 | None |
| Waseni | 25.6 | 5,760 | None |
| Selover | 29.4 | 6,470 | None |
| McGrath | 30 | 9,300 | 16 |
| Lane | 31 | 10,283 | None |

[1] Depth at bottom of zone.

I have now discovered that certain relatively water-insoluble carboxylic acids prevent the formation of acid sludge during acidization. In practice, the process of this invention comprises using these acids in conjunction with acidizing compositions heretofore employed.

Examples of carboxylic acids include fatty carboxylic acids of the formula

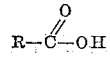

wherein R is a hydrocarbon or substituted hydrocarbon group containing at least six carbons, for example, six to twenty-four carbons, but preferably twelve to eighteen carbons. These acids are oil-soluble compounds which are relatively insoluble in the aqueous acid solution. In general, the activity of these compounds increases with increasing carbon chain length. For example, where the chain length increases from 8 to 16 carbons or more, the activity of the compound also increases. Typical examples of R include alkyl, alkenyl, alkynyl, cycloaliphatic, and like groups, for example these substituted with hydroxy, alkoxy, etc. groups.

It is well known that certain carboxylic organic acids containing a minimum of six but usually eight carbon atoms, are characterized by the fact that they combine with alkalies to produce soap or soap-like materials. These detergent-forming acids include fatty acids, resin acids, petroleum acids, etc. Certain derivatives of detergent-forming acids react with alkali to produce soap or soap-like materials, and are the obvious equivalent of the unchanged or unmodified detergent-forming acids, for instance, instead of fatty acids, one might employ derivatives of these acids, for example, the chlorinated fatty acids. Instead of the resin acids, one might employ the hydrogenated resin acids.

The compositions of matter herein described and employed as the sludge preventive of my process are preferably derived from unsaturated fatty acids having 12 to 18 carbon atoms. Such unsaturated fatty acids include the fatty acids such as dodecenoic, tetradecenoic, hexadecenoic, oleic, elaidic, ricinoleic, linoleic, linolenic, etc. One may employ mixed fatty acids, as, for example, the fatty acids obtained from hydrolysis of cottonseed oil, soybean oil, etc. My preferred acid sludge preventive is obtained from unsaturated fatty acids, and more especially, unsaturated fatty acids containing a hydroxyl radical. Of the various unsaturated fatty acids, my choice is the hydroxylated type, to wit, ricinoleic acid. However, for economic reasons, it is often desirable to employ fatty acids or mixtures of fatty acids derived from natural sources.

Mixed detergent-forming acids derived from animal or vegetable sources, for example, lard, coconut oil, rapeseed oil, sesame oil, palm kernel oil, palm oil, olive oil, tall oil, corn oil, cottonseed oil, sardine oil, tallow, soybean oil, peanut oil, castor oil, seal oil, whale oil, shark oil and other fish oils, teased oil, partially or completely hydrogenated animal and vegetable oils are advantageously employed. Also included are detergent-forming acids derived by oxidation and other methods, such as from wax, petroleum and similar hydrocarbons, etc., Twitchell fatty acids, etc.

In practice, an anti-sludging additive should have the following desirable properties. The additive should:

(1) Effectively prevent the formation of acid sludge in crude oil over a wide acid concentration, for example from 5 to 30 percent by weight of HCl.

(2) Require a small amount of reagent.

(3) Be easily dissolved, dispersed, suspended, or emulsified in the acid.

(4) Be stable in acid for many hours at 200° F.

(5) Be non-detrimental to the activity of other ingredients present in the acid.

(6) Be unaffected by spent acid or a 20 percent calcium chloride solution.

(7) Be so economical to employ that the additive can be used in the formulation of all oil well acid without the need of testing every crude oil for its sludge-forming characteristics.

The carboxylic acids of this invetnion fulfill all of the above requirements except that they are not easily dissolved or dispersed in the acidizing medium. Although they are very effective anti-sludging agents when dissolved in oil, they cannot be effectively employed unless they can be transported to the oil in the formation where they can fulfill this function. Since these carboxylic acids are substantially insoluble in the acidizing medium they must be emulsified in the acid by means of a suitable emulsifying agent that will not stabilize acid-in-oil emulsions which could be formed in the strata from which the oil is derived.

I have discovered a composition which fulfills all of the above requirements. In essence, this composition comprises an emulsion, suspension, or dispersion of said carboxylic acids in the acidizing medium. Any suitable method of effecting such an emulsion, suspension, or dispersion can be employed. However, I have discovered an effective composition capable of being facilely emulsified in the acidizing medium which comprises:

(1) A detergent-forming acid.

(2) A suitable emulsifier. A coupling agent such as a 3 to 10 carbon monohydroxy alcohol may also be employed if desired.

A suitable emulsifier for this invention is one which will, on one hand enable the insoluble substituted phenol to be emulsified in acid, and on the other hand break emulsions formed of the acid-in-oil type. Although there are hundreds of surface active agents which have been used as emulsifiers and demulsifiers, there are only a limited number of chemical materials which will accomplish this dual objective in the present system. It is readily understandable why most ordinary demulsifiers for preventing the formation of water-in-oil type emulsions are ineffective. Ordinary demulsifiers either are not soluble in half-strength (15%) hydrochloric acid, or its equivalent, or they are not soluble in spent brine which is roughly equivalent to 20 percent calcium chloride and having a pH of 3.5 to 5. Furthermore, if soluble at all, they are generally decomposed. If they do not decompose under ordinary conditions, they at least decompose under the conditions of pressure and temperature encountered during acidization. Examples of emulsifiers suitable for the purpose of this invention are best described by referring to one or more of the following patents:

U.S. Patent No. 2,470,829, dated May 24, 1949
U.S. Patent No. 2,470,830, dated May 24, 1949
U.S. Patent No. 2,499,370, dated March 7, 1950
U.S. Patent No. 2,589,195, dated March 11, 1952
U.S. Patent No. 2,589,196, dated March 11, 1952
U.S. Patent No. 2,589,197, dated March 11, 1952
U.S. Patent No. 2,589,198, dated March 11, 1952
U.S. Patent No. 2,589,199, dated March 11, 1952

A preferred type of emulsifier suitable for the purpose of this invention is described in U.S. Patent No. 2,499,370. It is an emulsifier comprising of a hydrophile oxyalkylated 2,4,6, $C_4$- to $C_{12}$-hydrocarbon substituted monocyclic phenol $C_1$- to $C_8$-aldehyde resin in which the ratio of oxyalkylene groups to phenolic nuclei is at least 2:1, and the alkylene radicals of the oxyalkylene groups for example those containing ethylene, propylene, butylene, hydroxypropylene, and hydroxybutylene radicals. In simple terms the emulsifier is an oxyalkylated phenol-formaldehyde resin.

I have prepared compositions which are very useful for the prevention of acid sludge during the acidization of oil bearing strata. The following is an example of such a composition which is easily emulsified in the oil well acid:

| | Percent by volume | |
|---|---|---|
| | General range | Preferable range |
| Sludge preventive acid | 80 to 99 | 90 to 96 |
| Emulsifier | 1 to 20 | 4 to 10 |

From an economy-effectiveness point of view, I have found the following compositions very satisfactory:

(1) Fatty acid ---------------------------------- Percent 95

$$R\overset{O}{\overset{\|}{C}}-OH$$

where R is $C_{12}$ to $C_{18}$.

(2) Emulsifier ---------------------------------- 5

As an example of a preferred emulsifier I use an oxyalkylated phenol-formaldehyde resin, comprising the octyl phenol-formaldehyde resin in which there are six moles of ethylene oxide added as the hydrophile. (See Example 8a, U.S. Patent 2,499,370.)

No acid sludge is formed when the above compositions are used in the acidizing wells in low concentrations, for example, 0.05–5% or more, but preferably 1–2%, based on volume of active reagent to volume of oil well acid employed. In practice, I advantageously employed one to two ml. of sludge preventive mixture per 100 ml. of oil well acid, based on a mixture which is at least 50% active.

The following laboratory test was devised to test anti-sludge properties:

Fifty ml. of 15% HCl or oil well acid are placed in a 4-oz. sample bottle. To this acid is added one ml. of anti-sludge material. The bottle is shaken thoroughly to insure complete mixing. Finally 50 ml. of a crude oil (known to form a sludge on contact with acid) is added, after which the bottle is closed and agitated by shaking for five minutes in a shaking machine at the rate of 130 oscillations per minute. The bottle is then removed and allowed to stand in a water bath for 16 hours at 140° F. and after this time separation of oil, acid, and sludge is complete. The oil layer can be poured off carefully from the underlying acid sludge layer or wafer if it is present. If there is only a small amount of sludge present in the oil layer, it may be observed as the residue which remains on a 4" by 4" piece of window screen through which the oil is poured for disposal. The relative volume of sludge may be compared with sludge from a comparable sample to which no sludge preventive was added. This comparison serves as an index of the effectiveness of a chemical in the prevention of sludge.

The following compositions tested as such and as emulsions, according to the above procedure, are good sludge preventatives:

TABLE II

| Ex. | Sludge preventatives |
|---|---|
| 1 | Acintol-D, distilled tall oil (51% oleic acid + 46% linoleic acid). |
| 2 | Bogol, crude tall oil (56-60% fatty acids + 34-40% rosin acids). |
| 3 | Capric acid. |
| 4 | Caprylic acid. |
| 5 | Indusoil: Fatty acids, 55-60%; rosin acids, 34-38%; sterols, 6-10%. |
| 6 | Myristic acid. |
| 7 | Oleic acid. |
| 8 | Palmitic acid. |
| 9 | Pamak No. 1, distilled tall oil (52.5% oleic acid, 46% linoleic acid). |
| 10 | Stearic acid. |
| 11 | Ricinoleic acid. |
| 12 | Castor oil. |
| 13 | Olive oil. |
| 14 | Peanut oil. |
| 15 | Neat's foot oil. |
| 16 | Tung oil. |
| 17 | Soybean oil. |
| 18 | Whale oil. |

The above fatty acids are also effective in emulsified form, in the general, preferred and optimum ranges of detergent-forming acid-emulsifier ratios stated above. Compositions containing emulsifiers formed by adding six moles of ethylene oxide to an octylphenol-formaldehyde resin (see Example 8a, U.S. Patent 2,499,370), and used in about 5% volume concentration in 95% of the detergent forming acids of Table II are employed as satisfactory anti-sludging agents as indicated by the above test.

In summary, I have found that detergent-forming acids prevent acid sludge and that a superior reagent can be prepared by admixing said acids with a suitable emulsifying agent. In general, this reagent contains one to 20%, but preferably 4 to 10% of an emulsifier.

The emulsifying agents employed should be capable of emulsifying these acids in the oil well acid without stabilizing oil-acid emulsion. The preferred class of emulsifiers are oxyalkylated phenol formaldehyde resins. The preferred species of these resins is described in U.S. Patent No. 2,499,370, Example 8a.

In view of the fact that acidization procedures and the use of other agents such as demulsifiers in acidizing procedures is so well known, there is no need to go into a discussion of acidizing procedures and other acidizing additives. For the sake of brevity, reference is made to the following patents which give a cross-sectional view of the art related to acidization, although there are in addition certain other practical elements which are well known and described in B. M. Kingston: "Acidizing Handbook," Gulf Publishing Company, Houston, Texas, 1947. The following United States patents are pertinent to the art of acidization of oil wells and the composition of materials used for this purpose:

| | |
|---|---|
| 1,877,504 | 2,232,931 |
| 1,891,667 | 2,233,383 |
| 1,911,446 | 2,251,393 |
| 2,011,579 | 2,262,737–742 |
| 2,024,718 | 2,278,838 |
| 2,038,956 | 2,290,417–417 |
| 2,053,285 | 2,290,419 |
| 2,125,429 | 2,292,208 |
| 2,128,161 | 2,300,393 |
| 2,128,601 | 2,370,421 |
| 2,161,085 | 2,400,395 |
| 2,175,081 | 2,663,689 |
| 2,175,095 | 2,824,834 |

The essence of the present invention is that the compositions herein disclosed and claimed are useful when employed as the sole additive in acidizing processes or in conjunction with other acidizing additives, for example, in any of the processes disclosed in the above patents or in similar processes.

Having thus described my invention, what I claim as new and desire to secure by Letters Patent is:

1. A process of preventing the formation of acid sludge resulting from the acidization of oil-bearing strata which is characterized by introducing into said strata during acidization (1) an anti-sludging amount of a detergent-forming carboxylic acid and (2) an emulsifying agent selected from the group consisting of
   (I) a reagent comprising an acylated derivative of a basic aminoalcohol of the formula:

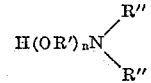

said derivatives thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy alkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; RCO being a substituent for a hydroxyl hydrogen atom; and the molecular weight of said compound in monomeric form is at least 213 and not over 4,000; said amino compound being selected from the class consisting of the anhydro base, the hydrated base, and salts;
   (II) a hydrophile oxyalkylated 2,4,6 $C_4$–$C_{12}$-hydrocarbon substituted monocyclic phenol $C_1$–$C_8$-aldehyde resin in which the ratio of oxyalkylene groups to phenolic nuclei is at least 2:1, the alkylene radical of the oxyalkylene group being a radical selected from the group consisting of ethylene, propylene, butylene, hydroxypropylene, and hydroxybutylene radicals;

(III) a mixture of I, II, and a blown fatty body selected from the group consisting of blown fatty oils and blown fatty acids, the proportions of I, II, and said blown fatty body, respectively, constituting not less than 10% each of the total active matter of said mixture;

(IV) a mixture of I, II, (a) a blown fatty body selected from the group consisting of blown fatty oils and blown fatty acids, and (b) a sulfonated fatty body selected from the group consisting of sulfonated fatty oils and sulfonated fatty acids substantially neutral to methyl orange indicator, the proportions of I, II, (a) and (b), respectively, constituting not less than 10% each of the total active matter of said mixture;

(V) a reagent comprising a substituted imidazoline selected from the group consisting of:

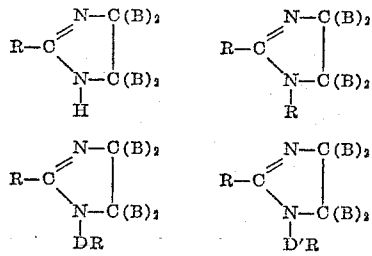

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms;

(VI) a reaction product produced by the reaction between a poly-halogenated non-ionized organic compound in which the halogen atoms are not directly attached to an aromatic ring and a surface-active condensation polymer of mean molecular weight not in excess of 2,000, which latter is in turn obtained by the heat-polymerization of a tertiary aminoalcohol of the formula:

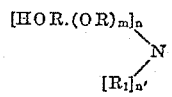

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of polyhalognated reactant, of not more than one halogen atom from the co-valent to the electro-valent state,
thereby emulsifying said detergent forming carboxylic acid in the acid medium without stabilizing oil-acid emulsions.

2. The process of claim 1 where the detergent-forming carboxylic acid is ricinoleic acid.

3. The process of claim 1 where the detergent-forming carboxylic acid is tall oil.

4. The process of claim 1 where the detergent-forming carboxylic acid is derived from castor oil.

5. The process of claim 1 where the detergent-forming carboxylic acid is derived from olive oil.

6. The process of claim 1 where the detergent-forming carboxylic acid is derived from peanut oil.

7. The process of claim 1 where the detergent-forming carboxylic acid is derived from neat's-foot oil.

8. The process of claim 1 where the detergent-forming carboxylic acid is derived from tung oil.

9. The process of claim 1 where the detergent-forming carboxylic acid is derived from soybean oil.

10. The process of claim 1 where the detergent forming carboxylic acid is derived from whale oil.

11. A composition of matter useful in preventing the formation of acid sludge during the acidization of oil-bearing strata which consists essentially of an emulsion of an anti-sludging amount of a detergent-forming carboxylic acid in the acid medium which is prepared by an emulsifier selected from the group consisting of (I) a reagent comprising an acylated derivative of a basic aminoalcohol of the formula:

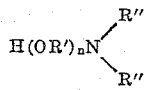

said derivatives thereof being such that there is at least one occurrence of the radical RCO, which is the acyl radical of a monocarboxy detergent-forming acid having at least 8 and not more than 32 carbon atoms; the amino nitrogen atom is basic; R" is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy alkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; RCO being a substituent for a hydroxyl hydrogen atom; and the molecular weight of said compound in monomeric form is at least 213 and not over 4,000; said amino compound being selected from the class consisting of the anhydro base, the hydrated base, and salts;

(II) a hydrophile oxyalkylated 2,4,6 $C_4$-$C_{12}$-hydrocarbon substituted monocyclic phenol $C_1$-$C_8$-aldehyde resin in which the ratio of oxyalkylene groups to phenolic nuclei is at least 2:1, the alkylene radical of the oxyalkylene group being a radical selected from the group consisting of ethylene, propylene, butylene, hydroxypropylene, and hydroxybutylene radicals;

(III) a mixture of I, II, and a blown fatty body selected from the group consisting of blown fatty oils and blown fatty acids, the proportions of I, II, and said blown fatty body, respectively, constituting not less than 10% each of the total active matter of said mixture;

(IV) a mixture of I, II, (a) a blown fatty body selected from the group consisting of blown fatty oils and blown fatty acids, and (b) a sulfonated fatty body selected from the group consisting of sulfonated fatty oils and sulfonated fatty acids substantially neutral to methyl orange indicator, the proportions of I, II, (a) and (b), respectively, constituting not less than 10% each of the total active matter of said mixture;

(V) a reagent comprising a substituted imidazoline selected from the group consisting of:

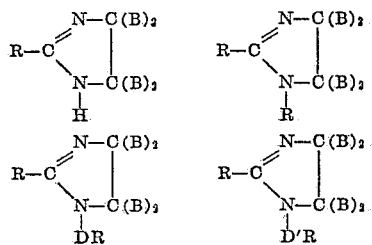

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing les than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms;

(VI) a reaction product produced by the reaction between a poly-halogenated non-ionized organic compound in which the halogen atoms are not directly attached to an aromatic ring and a surface-active condensation polymer of mean molecular weight not in excess of 2,000, which latter is in turn obtained by the heat-polymerization of a tertiary aminoalcohol of the formula:

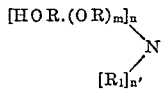

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of polyhalognated reactant, of not more than one halogen atom from the co-valent to the electro-valent state;

whereby the oil-acid emulsions are not stabilized.

12. The composition of claim 11 where the detergent-forming carboxylic acid is ricinoleic acid.
13. The composition of claim 11 where the detergent-forming carboxylic acid is tall oil.
14. The composition of claim 11 where the detergent-forming carboxylic acid is derived from castor oil.
15. The composition of claim 11 where the detergent-forming carboxylic acid is derived from olive oil.
16. The composition of claim 11 where the detergent-forming carboxylic acid is derived from peanut oil.
17. The composition of claim 11 where the detergent-forming carboxylic acid is derived from neat's-foot oil.
18. The composition of claim 11 where the detergent-forming carboxylic acid is derived from tung oil.
19. The composition of claim 11 where the detergent-forming carboxylic acid is derived from soybean oil.
20. The composition of claim 11 where the detergent-forming carboxylic acid is derived from whale oil.
21. A composition of matter useful in preventing the formation of acid sludge during acidization of oil-bearing strata which is characterized by a major amount of a detergent-forming carboxylic acid and a minor amount of an emulsifier selected from the group consisting of (I) a reagent comprising an acylated derivative of a basic aminoalcohol of the formula:

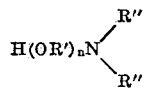

said derivatives thereof being such that there is at least one occurrence of the radical RCO, which is the acyl radical of a monocarboxy detergent-forming acid having at least 8 and not more than 32 carbon atoms; the amino nitrogen atom is basic; R" is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy alkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; RCO being a substituent for a hydroxyl hydrogen atom; and the molecular weight of said compound in monomeric form is at least 213 and not over 4,000; said amino compound being selected from the class consisting of the anhydro base, the hydrated base, and salts;

(II) a hydrophile oxyalkylated 2,4,6 $C_4$–$C_{12}$-hydrocarbon substituted monocyclic phenol $C_1$–$C_8$-aldehyde resin in which the ratio of oxyalkylene groups to phenolic nuclei is at least 2:1, the alkylene radical of the oxyalkylene group being a radical selected from the group consisting of ethylene, propylene, butylene, hydroxypropylene, and hydroxybutylene radicals;

(III) a mixture of I, II, and a blown fatty body selected from the group consisting of blown fatty oils and blown fatty acids, the proportions of I, II, and said blown fatty body, respectively, constituting not less than 10% each of the total active matter of said mixture;

(IV) a mixture of I, II, (a) a blown fatty body selected from the group consisting of blown fatty oils and blown fatty acids, and (b) a sulfonated fatty body selected from the group consisting of sulfonated fatty oils and sulfonated fatty acids substantially neutral to methyl orange indicator, the proportions of I, II, (a) and (b), respectively, constituting not less than 10% each of the total active matter of said mixture;

(V) a reagent comprising a substituted imidazoline selected from the group consisting of:

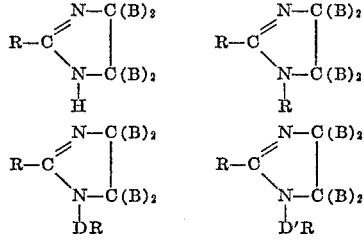

in which B represents at least one member selected from the class consisting of hydrogen and low molal alkyl radicals having less than 8 carbon atoms; D represents a divalent, non-amino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms;

(VI) a reaction product produced by the reaction between a poly-halogenated non-ionized organic compound in which the halogen atoms are not directly attached to an aromatic ring and a surface-active condensation polymer of mean molecular weight not in excess of 2,000, which latter is in turn obtained by the heat-polymerization of a tertiary aminoalcohol of the formula:

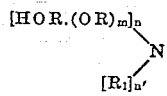

in which formula, OR is an alkylene oxide radical having not more than 4 carbon atoms and selected from the class consisting of ethylene oxide radicals, propylene oxide radicals, butylene oxide radicals, glycide radicals, and methylglycide radicals— $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of polyhalognated reactant, of not more than one halogen atom from the covalent to the electro-valent state, whereby there is emulsified said detergent-forming acid in an acid medium without stabilizing oil-acid emulsions.

22. The composition of claim 21 where the detergent-forming carboxylic acid is ricinoleic acid.
23. The composition of claim 21 where the detergent-forming carboxylic acid is tall oil.
24. The composition of claim 21 where the detergent-forming carboxylic acid is derived from castor oil.
25. The composition of claim 21 where the detergent-forming carboxylic acid is derived from olive oil.
26. The composition of claim 21 where the detergent-forming carboxylic acid is derived from peanut oil.
27. The composition of claim 21 where the detergent-forming carboxylic acid is derived from neat's-foot oil.
28. The composition of claim 21 where the detergent-forming carboxylic acid is derived from tung oil.
29. The composition of claim 21 where the detergent-forming carboxylic acid is derived from soybean oil.
30. The composition of claim 21 where the detergent-forming carboxylic acid is derived from whale oil.

References Cited in the file of this patent
UNITED STATES PATENTS

| | | |
|---|---|---|
| 2,204,580 | DeGroote et al. | June 18, 1940 |
| 2,336,714 | Butler et al. | Dec. 14, 1943 |
| 2,802,531 | Cardwell et al. | Aug. 13, 1957 |